Patented Sept. 8, 1931

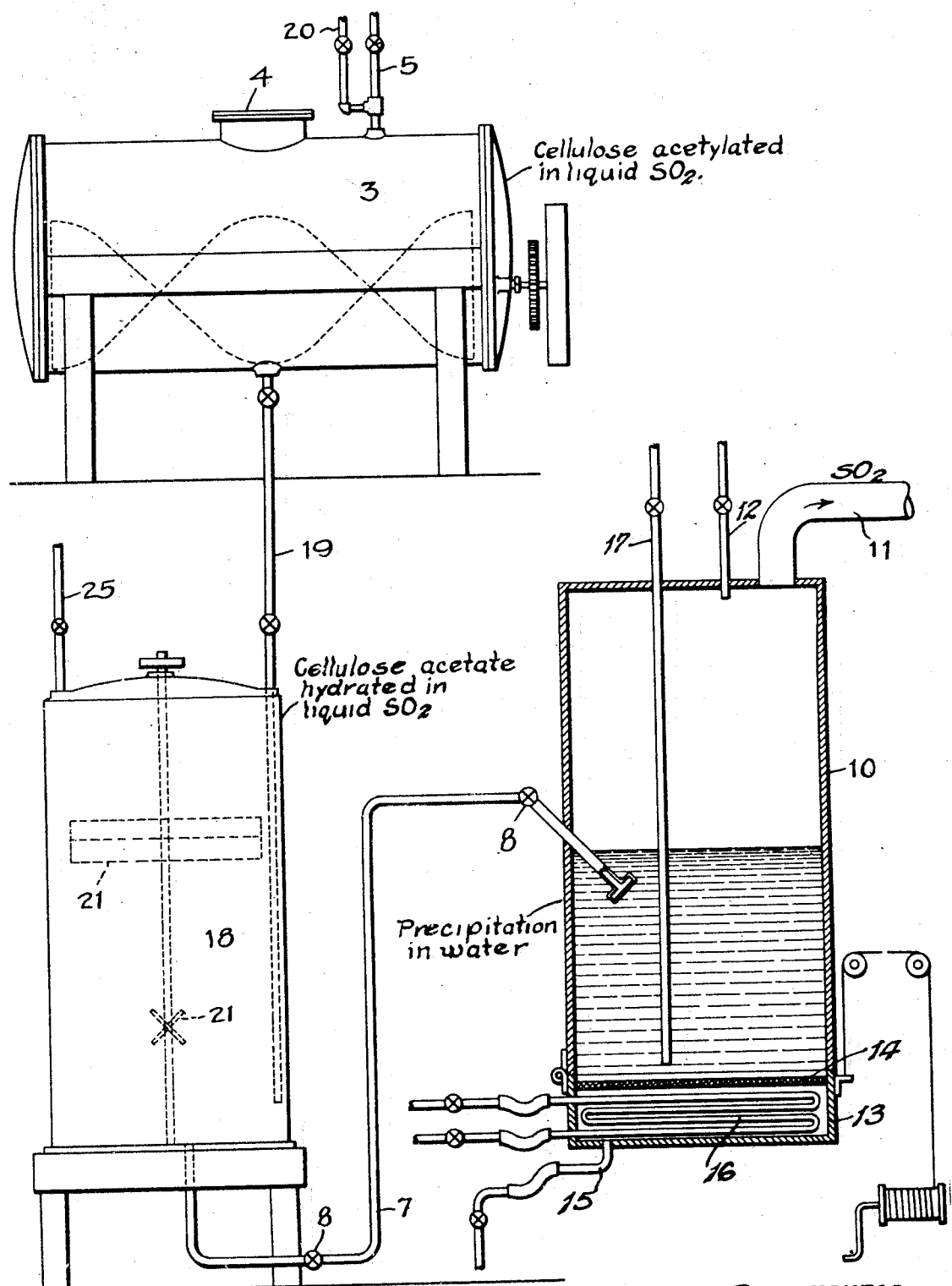

1,822,563

UNITED STATES PATENT OFFICE

LLOYD M. BURGHART, OF BALTIMORE, MARYLAND, ASSIGNOR TO U. S. INDUSTRIAL ALCOHOL CO., OF NEW YORK, N. Y., A CORPORATION OF WEST VIRGINIA

MANUFACTURE OF CELLULOSE ACETATE

Application filed April 30, 1929. Serial No. 359,368.

In my copending application, Serial No. 256,817, filed February 24, 1928, of which this application is a continuation in part, I disclosed a process for acetylating cellulose, or cellulose derivatives such as hydro-cellulose, by reacting the same with an acetylating agent such as acetic anhydride or acetyl chlorid, in the presence of liquid sulfur dioxid as a reaction solvent or medium.

The usual practice was to acetylate the cellulose or cellulose derivative in a bath containing acetic anhydride, glacial acetic acid, and a catalyst or condensing agent such as sulfuric acid.

My process has important advantages, among which are the uniformity, whiteness and favorable physical structure of the products obtainable and the ease of control of the manufacturing reactions.

I am not prepared to give a full explanation of the action of the liquid sulfur dioxid in this acetylation process, like the acetic acid used in the ordinary processes, it appears to dissolve the cellulose acetate as it is formed so that the acetic anhydride, or other active acetylating agent, can continue to act effectively on the material to be acetylated. Other more familiar solvents for cellulose acetate, however, have not been found to be suitable media for acetylation in the sense that acetic acid and liquid sulfur dioxide are, in view of which it is to be presumed that the liquid sulfur dioxid has a chemical or catalytic function in addition to its role as a reaction medium. The amount employed is such that it is to be regarded as a reaction solvent or colloiding medium, and for effective results a catalyst, such as sulfuric acid, is employed as in other processes.

While the advantages of this acetylation process result from the use of liquid sulfur dioxid rather than glacial acetic acid, it is evident that both may be employed if desired provided always that the liquid sulfur dioxid is a large constituent of the medium.

The acetylating agent is preferably acetic anhydride, but may be acetyl chlorid or other suitable active acetylating agent, or mixture of such agents.

The so-called catalyst is typically sulfuric acid, but any of the other catalysts known for use in the acetylation of cellulose, such as zinc chlorid, phosphoric acid and dimethyl sulfate, may be employed.

In my prior application, it was also disclosed that I had ascertained that liquid sulfur dioxid was an advantageous medium in which to carry out an after-hydration treatment.

Acetylation operations usually produce cellulose acetate which is soluble for commercial purposes in chloroform, though the operation may be so conducted as to obtain cellulose acetate which is soluble in a mixture of alcohol and chloroform. The forms of cellulose acetate which are more particularly desired and more valuable are those which are readily soluble in acetone or acetic ether (ethyl acetate), and such forms are usually obtained by a so-called hydration treatment which converts the chloroform-soluble or alcohol-chloroform-soluble type into another desired type of solubility such as those indicated. The kinds of solubility of cellulose acetate bear a relation to the constitution of the complex molecule. Thus, it is believed that the range includes mono-, di- and tri-acetates that the chloroform-soluble form corresponds to tri-acidyl cellulose and that the acetone-soluble form is a product which is on the order of half tri-acidyl and half di-acidyl cellulose. However, these are largely assumptions.

The practical object of after-hydration treatments is to alter the constitution of the cellulose acetate molecule or aggregate obtained as the result of acetylation, to a form or condition which is readily soluble in acetone, ethyl acetate, or other solvent or solvents which are not usable commercially for "primary" cellulose acetate. The change may be explained as a partial de-acetylation, or as a hydrolysis or saponification, or it may be in the nature of a partial splitting up of the molecular aggregate.

Such hydration treatments consist essentially of a prolonged digestion of the solution or colloidal suspension of the cellulose acetate with a so-called hydrating agent, which is usually water in a limited amount below that which would produce precipitation. The catalyst, such as sulfuric acid, which was used for the acetylation step, also aids the hydration treatment, or a different or additional catalyst may be employed at this time. It is not uncommon to dilute the water introduced for hydration with acetic acid, and that is not necessarily excluded in my hydration process, though it is desirable to avoid the expense of recovering dilute acetic values from any source. The use of alcohol as a diluent for the hydration water was disclosed in my prior application; also that alcohol alone could be used as the hydration agent. It was also disclosed that additional liquid sulfur dioxid might be introduced in connection with hydration; also that the sulfuric acid catalyst can be eventually neutralized or its subsequent action diminished by the addition of an alkaline agent such as sodium acetate.

The present application includes the hydration treatment for cellulose acetate, not commercially soluble in acetone, to produce a form readily soluble in acetone, or other solvents, in which treatment liquid sulfur dioxid is utilized largely or entirely as the liquid medium. The advantages of such a process are the ease with which the operation can be conducted, the facility of control, both during the operation and in the handling of the product afterwards, and the whiteness, uniformity and excellent physical condition of the product which is obtainable. The chemical or physical action of the liquid sulfur dioxid in this operation can not be stated with certainty, but the benefits are important.

The present application includes the combined processes, wherein the cellulose or cellulose derivative is acetylated in a medium comprising liquid sulfur dioxid, and the resulting mixture or solution containing the cellulose acetate thus formed is then subjected to a hydration treatment in the presence of the same $SO_2$ medium, with or without the addition of further liquid sulfur dioxid or other solvent.

It also includes the hydration treatment of cellulose acetate of the chloroform-soluble or alcohol-chloroform-soluble types, however produced, and whether previously completely manufactured and separated or not in such medium. Thus chloroform-soluble cellulose acetate made by the usual acetic anhydride and glacial acetic acid process, may after separation or precipitation from the original solution, be put in solution in liquid sulfur dioxid, or a mixture in large part sulfur dioxid, and then be subjected to the hydration treatment. Again, chloroform-soluble cellulose acetate as a finished article of commerce may be so dissolved and treated. Furthermore, acetylation may be conducted in a medium of liquid sulfur dioxid, after which the cellulose acetate may be separated from the natal solution in such a way as to avoid breaking down of the surplus acetic anhydride, after which the cellulose acetate may be re-dissolved in liquid sulfur dioxid and be digested with the addition of water, or other hydrating agent, and sulfuric acid, or other catalyst, to bring about the desired change in the cellulose ester.

Special advantage is realized by the two-stage operation in which the cellulose or cellulose derivative is acetylated in a medium consisting wholly or largely of liquid sulfur dioxid, following which the then-existing reaction mixture, solution, suspension or fluid jell is subjected to hydration in the presence of the same liquid sulfur dioxid which served for the acetylation, aided or not by the same catalyst.

The accompanying drawing forming part hereof is a schematic view of one form of equipment for carrying out the invention.

The numeral 3 designates a closed reaction vessel adapted to retain the required pressure, this vessel being provided with a cover 4 which can be tightly closed and can be removed, and with a valved inlet 5 for introducing liquid materials. Within the vessel there is a stirrer 6 arranged to be driven by power. A pipe 19 is connected with the lower portion of the vessel and is provided with one or more valves, this conduit connecting with another pressure vessel 18, having a discharge pipe 7, provided with one or more valves 8.

The pipe 7 may deliver into a body of water in a precipitating chamber 10, this chamber being enclosed and having an offtake 11 for collecting and conducting away the sulfur dioxid gas, to be liquefied for re-use.

The precipitation chamber is shown provided with a valved inlet 12 for admitting precipitating liquid, and with a tight hinged bottom 13 for discharging the precipitated cellulose, after the liquid has been drawn off through a filter 14 and a valved line 15 leading to an acetic acid recovery system. A moderate amount of heat may be supplied by a steam coil 16 in the bottom 13 beneath the filter 14, or by a valved steam line 17 having its outlet a short distance above the filter 14 so as to be submerged by the body of precipitating liquid.

The material treated for esterification may be cellulose in any suitable form, or a cellulose derivative, for example, hydro-cellulose, and the acetylation may be preceded by any appropriate pre-treatment.

The following is given as a specific example.

100 parts of cellulose, 260 parts of acetic anhydride as an acetylating agent, 1000 parts of liquid sulfur dioxid, and 3 parts of sulfuric acid as a catalyst or condensing agent, are digested in the vessel 3 at a suitable temperature, preferably at about 20°–30° C., and at corresponding pressure, until test shows that the reaction has proceeded to the desired degree.

The cellulose or cellulose derivative is placed in the vessel through the opening which is ordinarily tightly closed by the cover 4, and the liquid materials may be introduced through the valved inlet 5.

As indicated in my original application, the proportions of the ingredients may be varied. The temperature may also be varied. The time required may vary from about 6 to 18 hours depending upon conditions, for example, the amount of the liquid medium employed in relation to the other ingredients, the temperature and the efficiency of the stirring mechanism.

During the course of the treatment the cellulose loses its original structure and the cellulose acetate apparently dissolves in the liquid sulfur dioxid, the result at the end of this stage of the operation being that of a thickish liquid or semi-fluid mass, practically homogeneous and readily flowable through pipes under pressure of the $SO_2$ gas or vapor; the precise consistency of the fluid mass of liquid varying according to the amount of liquid medium present and other conditions. It is difficult to say whether the condition is strictly that of a colloidal solution, dispersion or suspension, or whether the mass is a fluid mixture akin to these, but for practical purposes it can be regarded as a solution.

In the example given, it will be understood that the solution of cellulose acetate in liquid sulfur dioxid existing when the acetylation reaction has been carried to the desired point, contains also the small amount of catalyst, the surplus acetic anhydride and some acetic acid.

The cellulose acetate thus produced is usually the chloroform-soluble form, though the acetylation may be so conducted as to yield cellulose acetate which is soluble in a mixture of alcohol and chloroform.

After-hydration may be carried out in the acetylation vessel 3, but for operating convenience the contents of the vessel 3, containing the chloroform-soluble or alcohol-chloroform-soluble cellulose acetate, may be transferred through the valved conduit 19 into the pressure vessel 18, where the hydration treatment is effected. As is well understood, the amount of the hydrating agent or agents should be enough to break down the surplus acetic anhydride left from the acetylation treatment and leave a surplus of water, a surplus of 3%–5% of the reaction mixture being sufficient to give the desired result.

The hydrating agent or mixture may be introduced into the vessel 18, but there is a practical advantage in admitting it to the mass in the vessel 3 shortly before the transfer of the contents to the vessel 18, advantage being thereby taken of the thorough mixing action of the stirrer of the acetylating vessel.

As a concrete example, 55 parts of water and 6 parts of sulfuric acid may be introduced through the valved connection 20 to the mixture in the vessel 3 about 20 minutes before the transfer is made, the mass being then run into the vessel 18 and being there digested, preferably with mild stirring by stirrers 21, for 18–36 hours, or longer, until test samples indicate the desired degree of acetone-solubility. This digestion may be carried out at a temperature around 65°–70° C., but lower temperatures around 45° C. are preferable.

When this treatment has been carried as far as is desired, the fluid or liquid mass, consisting of cellulose acetate in solution or suspension in the liquid sulfur dioxid and such amount of acetic acid as is present, together with such other ingredients as there may be, is discharged through the pipe 7 on the opening of the valve or valves 8, into contact with water or other precipitating liquid in the chamber 10.

Shortly before separating the acetone-soluble cellulose acetate from the sulfur dioxid, 14.6 parts of sodium acetate in solution in water are preferably introduced through a valved pipe 25 into the mixture in the hydration vessel 18 to neutralize the sulfuric acid. In place of the sodium acetate, other alkaline salts, such as sodium bisulfite, or even alkalies themselves may be employed. The neutralizing agent is added to stop any further action of the catalyst, especially if precipitation is to be delayed.

The length of time required for the hydration treatment will vary according to the temperatures used, the proportions and other operating conditions. Under any given set of conditions, the time to stop the treatment can be readily ascertained by taking test samples. If the acetone-soluble type of cellulose acetate is desired, treatment is stopped when test samples show the desired degree of acetone solubility. If the ethyl-acetate-soluble type is desired, the treatment is continued until test samples indicate that the cellulose acetate has been altered so that it comes to be readily soluble in that solvent. In general, other types of solubility can be obtained by carrying the hydration treatment to the proper point in each case.

I claim:

1. The process which comprises treating cellulose with an acetylating mixture containing liquid sulfur dioxid, to produce cellulose acetate, and then introducing a hydrating agent and subjecting the cellulose acetate in the presence of the liquid sulfur dioxid to further treatment to convert the cellulose acetate to a form soluble in acetone.

2. In the manufacture of cellulose acetate, the step of hydrating cellulose acetate in the presence of liquid sulfur dioxid.

3. The method of manufacturing cellulose acetate which comprises subjecting the material to an acetylation in the presence of a medium comprising liquid sulfur dioxid, and then proceeding with a hydration treatment in the same medium.

4. The method of manufacturing cellulose acetate which comprises reacting the material under pressure with an acetylating agent in the presence of a medium comprising liquid sulfur dioxid and with the aid of a catalyst, and then proceeding with a hydration treatment comprising the digestion, under pressure, of the mixture resulting from the acetylation stage, with a hydration agent to alter the solubility of the cellulose acetate.

5. The method of manufacturing cellulose acetate which comprises reacting the material under pressure with an acetylating agent in the presence of a medium comprising liquid sulfur dioxid and with the aid of a catalyst, and then proceeding with a hydration treatment comprising the digestion, under pressure, of the mixture resulting from the acetylation stage, with a hydration agent and additional catalyst.

6. The method of manufacturing cellulose acetate which comprises reacting the material under pressure with an acetylating agent in the presence of a medium comprising liquid sulfur dioxid and with the aid of a catalyst and then proceeding with a hydration treatment comprising the digestion, under pressure, of the mixture resulting from the acetylation stage, with a hydration agent, an agent for neutralizing the catalyst being added toward the end of the hydration stage.

7. The step of hydrating cellulose acetate so as to change its type of solubility, which comprises digesting a fluid mixture comprising cellulose acetate, liquid sulfur dioxid and a relatively small quantity of water.

8. The step of hydrating cellulose acetate so as to change its type of solubility, which comprises digesting cellulose acetate in liquid sulfur dioxid with a hydration agent and a catalyst.

LLOYD M. BURGHART.